(12) United States Patent
Pears

(10) Patent No.: US 6,897,262 B2
(45) Date of Patent: May 24, 2005

(54) SCAVENGER RESIN AND PROCESSES FOR THE USE THEREOF

(75) Inventor: David Alan Pears, Manchester (GB)

(73) Assignee: Avecia Limited, Manchester (GB)

( * ) Notice: Subject to any disclaimer, the term of this patent is extended or adjusted under 35 U.S.C. 154(b) by 43 days.

(21) Appl. No.: 10/311,871

(22) PCT Filed: Jun. 20, 2001

(86) PCT No.: PCT/GB01/02714

§ 371 (c)(1),
(2), (4) Date: Dec. 20, 2002

(87) PCT Pub. No.: WO01/98378

PCT Pub. Date: Dec. 27, 2001

(65) Prior Publication Data

US 2004/0082707 A1 Apr. 29, 2004

(30) Foreign Application Priority Data

Jun. 22, 2000 (GB) .............................................. 0015245

(51) Int. Cl.⁷ .................................................. C08F 6/10
(52) U.S. Cl. ............................... 525/328.6; 525/332.3; 525/332.7; 528/482
(58) Field of Search .......................... 525/328.6, 332.3, 525/332.7; 528/482

(56) References Cited

U.S. PATENT DOCUMENTS

| | | | |
|---|---|---|---|
| 3,770,700 A | 11/1973 | Forgione | 260/64 |
| 5,548,024 A | * 8/1996 | Lavoie et al. | 525/102 |
| 6,090,882 A | * 7/2000 | Trumbo et al. | 524/555 |

FOREIGN PATENT DOCUMENTS

| | | |
|---|---|---|
| EP | 0 492 847 A2 | 7/1992 |
| EP | 0 634 393 A1 | 1/1995 |
| EP | 0 808 853 A2 | 11/1997 |
| WO | 97/08134 | 3/1997 |
| WO | 97/45468 | 12/1997 |
| WO | 97/45495 | 12/1997 |

* cited by examiner

*Primary Examiner*—Tatyana Zalukaeva
*Assistant Examiner*—Satya Sastri
(74) *Attorney, Agent, or Firm*—Morgan, Lewis & Bockius LLP

(57) ABSTRACT

Scavenger resins comprising pendant groups specific for the removal of primary amines form solution in the presence of secondary amines are provided. Processes for the use of these scavenger resins, especially in solid phase synthesis, for the removal of primary amines from solution or for the removal of electrophiles from solution are provided.

22 Claims, No Drawings

SCAVENGER RESIN AND PROCESSES FOR THE USE THEREOF

This invention relates to scavenger resins and to processes which use the scavenger resin for the selective removal of primary amines or for the removal of electrophiles from solution.

Over the past few years, the exploration and utilization of combinatorial chemistry (and multi parallel synthesis) as a pharmaceutical drug discovery technology has rapidly evolved. The field of combinatorial/multi parallel chemistry has expanded to include not only solid and solution-phase methods for expedited compound synthesis, but also hybrid approaches which combine the purification advantages of solid-phase synthesis with the flexibility of solution-phase synthesis. (Kaldor, S. W. and Siegel, M. G., Curr. Opin. Chem. Biol. 1997, 1, 101–106 and Thompson, L. A. and Ellman J. A., Chem. Rev. 1996, 96, 555–600) Inherent in any approach to produce chemical libraries is the need to rapidly purify, isolate, and manipulate chemical library members during their preparation.

Polymeric scavenging reagents have emerged as useful tools for combinatorial synthesis, particularly, for solution-phase chemical library synthesis. These materials are employed to remove, or scavenge, unwanted reagents or bi-products and thus aid in the purification of materials. (Creswell, M. W. et. al., Tetrahedron, 1998, 54, 3983–3998; Kaldor, S. W. et. al., Tetrahedron Lett. 1996, 37, 7193–7196; Flynn, D. L. et. al., S., J. Am. Chem. Soc. 1997, 119, 4874–4882; Kaldor, S. W. et. al., Bioorg. Med. Chem. Lett. 1996, 24(6), 3041–3044; Caldarelli, M. et. al., J. Chem. Soc., Perkin Trans. 1. 1999, 107–110; Booth, R. J. and Hodges, J. C., J. Am. Chem. Soc. 1997, 119, 4882–4886; Gayo, L. M. and Suto, M. J., Tetrahedron Lett. 1997, 38, 513–516; and Siegel, M. G. et. al., Tetrahedron Left. 1997, 38, 3357–3360). Typically, the polymeric scavengers are added after the chemical reaction is complete to remove excess reactants and bi-products. The resulting resin bound reactants are removed by simple filtration leaving the product in solution. Examples of polymeric scavenger reagents include:

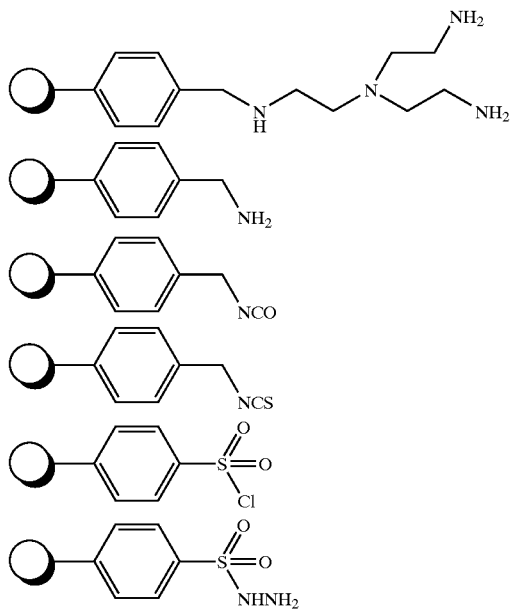

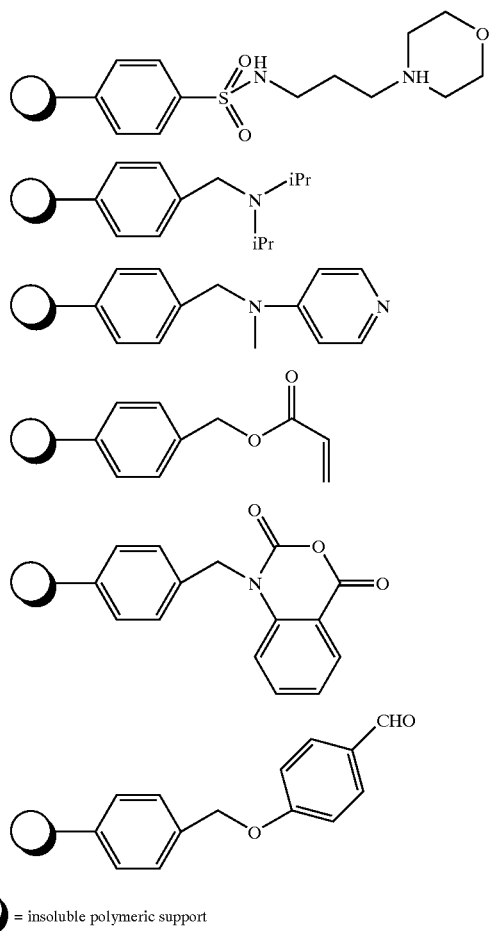

All the above resins are made by initial synthesis of a polystyrene or polystyrene copolymer bead followed by one or more chemical modification steps to introduce the scavenging functionality. For example, the isocyanate functional bead which is sold as a scavenger for amines can be prepared from the Merrified resin via the amino methyl polystyrene:

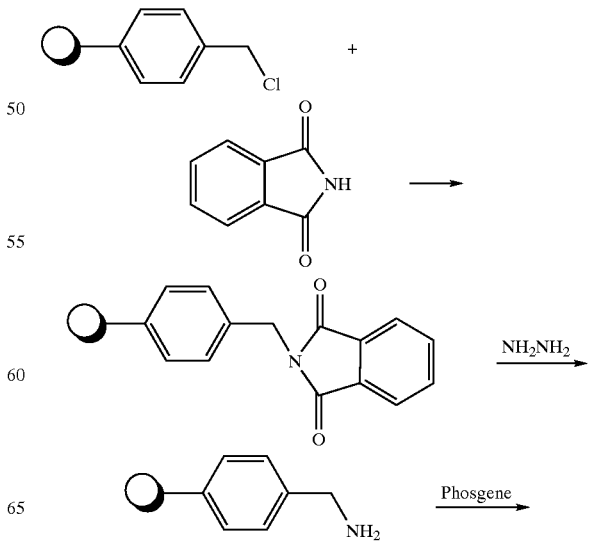

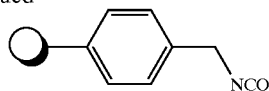

The resins used are typically lightly crosslinked polystyrenes (1 to 3% divinyl benzene) which typically require solvents that will swell the resin to allow reagents to access the polymer bound functional groups. Alternatively the resin could be a macroporous resin (high divinylbenzene content) which has permanent porosity allowing reactants to access the functional groups independent of the solvent type.

One area of synthesis where the use of scavenger resins is potentially useful is for example in the synthesis of secondary amines. Secondary amines are important pharmacophores in many biologically active compounds. Often, they are prepared by reductive alkylation of primary amines with aldehydes or ketones. To alleviate problems of over alkylation, an excess of primary amine is employed. However, this presents problems with purification in that the primary amine has to be selectively removed in the presence of the secondary amine.

Methyl isocyanate, isothiocyanate and N-methylisatoic anhydride resins all react rapidly with both primary and secondary amines at room temperature. These resins are electrophilic scavengers and show poor selectivity for primary amines over secondary amines. The benzyloxybenzaldehye polystyrene resin is also an electrophilic scavenger and can be used to selectively sequester primary amines in the presence of secondary amines. However, the benzaldehyde resins which have been reported are not particularly stable and may be oxidized in air. There is therefore a need for functionalised resins which act as electrophilic scavengers and exhibit selectivity for primary amines and show good chemical stability.

According to a first aspect of the present invention there is provided a process for removing primary amines from solution wherein a solution comprising a primary amine is contacted with a scavenger resin, whereby the scavenger resin binds to at least some of the primary amine in solution thereby decreasing the amount of primary amine in solution, characterised in that the scavenger resin comprises pendant groups selected from 1,3ketoesters or 1,3-ketoamides or mixtures thereof attached to a polymer support.

In the process of the present invention, the scavenger resin may be added to a solution comprising a primary amine. The resin is then separated from the solution, preferably by filtration, the contact time being such as to allow for at least partial depletion of primary amine in solution. Alternatively, a solution comprising a primary amine is passed through a mass or column of resin, the dwell time being such as to allow for at least partial depletion of primary amine in solution. Contact or dwell time can be determined by monitoring reductions in levels of primary amine in solution.

The process of the present invention may be carried out at temperatures ranging from −100 to 250° C., preferably from −10 to 100° C., more preferably from 10 to 40° C. and most preferably at ambient temperature, for example from 15 to 30° C.

In the process of the present invention preferably sufficient scavenger resin is employed to effect the removal of substantially all the primary amine. Preferably, the ratio of scavenger resin to primary amine solution employed is directly related to the concentration of primary amine present and the percentage of 1,3-ketoester and/or 1,3ketoamide active functionality on the scavenger resin.

The ratio of molar concentration of 1,3-ketoester and/or 1,3-ketoamide active functionality on the scavenger resin to molar concentration of amine in solution may be in the range from 1:1 to 100:1. Preferably an excess of 1,3-ketoester and/or 1,3-ketoamide active functionality is employed, for example ratios in the range of 1:1 to 20:1 or more preferably in the range of 1:1 to 4:1. Such excesses may promote effective and fast removal of the primary amine.

The scavenger resins employed in the process of the present invention can have 1,3-ketoester or 1,3-ketoamide pendant groups attached directly to a polymer support or attached to a polymer support through a linking group. Preferably, the 1,3-ketoester or 1,3-ketoamide pendant groups are attached to a polymer support through a linking group. Suitable linking groups include those groups as set out below in the definition of L.

The scavenger resins are preferably organic resins, particularly synthetic organic resins.

The 1,3-ketoester or 1,3-ketoamide pendant groups include groups of formula 1:

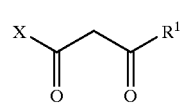

(1)

wherein
R$^1$ is an optionally substituted hydrocarbyl, perhalogenated hydrocarbyl or heterocyclyl group;
X is O or NR$^2$, wherein the free valence of O or NR$^2$ is bonded to a polymer support optionally via a linker; and
R$^2$ is hydrogen, an optionally substituted hydrocarbyl, or heterocyclyl group.

Hydrocarbyl groups which may be represented by R$^1$ and R$^2$ include alkyl, alkenyl and aryl groups, and any combination thereof, such as aralkyl and alkaryl, for example benzyl groups.

Alkyl groups which may be represented by R$^1$ and R$^2$ include linear and branched alkyl groups comprising up to 20 carbon atoms, particularly from 1 to 7 carbon atoms and preferably from 1 to 5 carbon atoms. When the alkyl groups are branched, the groups often comprise up to 10 branched chain carbon atoms, preferably up to 4 branched chain atoms. In certain embodiments, the alkyl group may be cyclic, commonly comprising from 3 to 10 carbon atoms in the largest ring and optionally featuring one or more bridging rings. Examples of alkyl groups which may be represented by R$^1$ and R$^2$ include methyl, ethyl, propyl, 2-propyl, butyl, 2-butyl, t-butyl and cyclohexyl groups.

Alkenyl groups which may be represented by R$^1$ and R$^2$ include C$_{2-20}$, and preferably C$_{2-6}$ alkenyl groups. One or more carbon—carbon double bonds may be present. The alkenyl group may carry one or more substituents, particularly phenyl substituents. Examples of alkenyl groups include vinyl, styryl and indenyl groups.

Aryl groups which may be represented by R$^1$ and R$^2$ may contain 1 ring or 2 or more fused rings which may include cycloalkyl, aryl or heterocyclic rings. Examples of aryl groups which may be represented by R$^1$ and R$^2$ include phenyl, tolyl, fluorophenyl, chlorophenyl, bromophenyl, trifluoromethylphenyl, anisyl, naphthyl and ferrocenyl groups.

Perhalogenated hydrocarbyl groups which may be represented by R independently include perhalogenated alkyl and aryl groups, and any combination thereof, such as aralkyl and alkaryl groups. Examples of perhalogenated alkyl groups which may be represented by R include —$CF_3$ and —$C_2F_5$.

Heterocyclic groups which may be represented by $R^1$ and $R^2$ independently include aromatic, saturated and partially unsaturated ring systems and may constitute 1 ring or 2 or more fused rings which may include cycloalkyl, aryl or heterocyclic rings. The heterocyclic group will contain at least one heterocyclic ring, the largest of which will commonly comprise from 3 to 7 ring atoms in which at least one atom is carbon and at least one atom is any of N, O, S or P. Examples of heterocyclic groups which may be represented by $R^1$ and $R^2$ include pyridyl, pyrimidyl, pyrrolyl, thiophenyl, furanyl, indolyl, quinolyl, isoquinolyl, imidazoyl and triazoyl groups.

When any of $R^1$ or $R^2$ is a substituted hydrocarbyl or heterocyclic group, the substituent(s) should be such so as not to adversely affect the rate or selectivity of the reaction. Optional substituents include halogen, cyano, nitro, hydroxy, amino, thiol, acyl, hydrocarbyl, perhalogenated hydrocarbyl, heterocyclyl, hydrocarbyloxy, mono or di-hydrocarbylamino, hydrocarbylthio, esters, carbonates, amides, sulphonyl and sulphonamido groups wherein the hydrocarbyl groups are as defined for $R^1$ and $R^2$ above. One or more substituents may be present.

$R^1$ is preferably an alkyl group, most preferably a methyl group.

$R^2$ is preferably hydrogen or an alkyl group. When $R^2$ is an alkyl group, preferably $R^2$ is a methyl group. Most preferably $R^2$ is hydrogen.

The polymer support may be derived from the polymerisation of a composition comprising one or more monomers, and is preferably derived from the polymerisation a composition comprising of two or more monomers. The monomers may contain one or more polymerisable double bonds. Preferably the polymer support is derived from the polymerisation of a composition comprising one or more monomers containing only one polymerisable double bond, and one or more monomers containing two or more polymerisable double bonds. Most preferably the polymer support is derived from the polymerisation of a composition comprising one or two monomers containing only one polymerisable double bond, and one monomer containing two or three polymerisable double bonds.

Examples of monomers containing only one polymerisable double bond include styrene and substituted styrenes such as α-methyl styrene, methyl styrene, t-butyl styrene, bromo styrene and acetoxy styrene; alkyl esters of mono-olefinically unsaturated dicarboxylic acids such as di-n-butyl maleate and di-n-butyl fumarate; vinyl esters of carboxylic acids such as vinyl acetate, vinyl propionate, vinyl laurate and vinyl esters of versatic acid such as VeoVa 9 and VeoVa 10 (VeoVa is a trademark of Shell); acrylamides such as methyl acrylamide and ethyl acrylamide; methacrylamides such as methyl methacrylamide and ethyl methacrylamide; nitrile monomers such as acrylonitrile and methacrylonitrile; and esters of acrylic and methacrylic acid, preferably optionally substituted $C_{1-20}$ alkyl and $C_{1-20}$ cycloalky esters of acrylic and methacrylic acid, such as methyl acrylate, ethyl acrylate, n-butyl acrylate, 2-ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate and N,N-dimethylaminoethyl methacrylate. Functional derivatives of the foregoing monomers containing only one polymerisable double bond can also be employed.

Examples of monomers containing two or more polymerisable double bonds include divinylbenzene (DVB), trivinylbenzene, and multifunctional acrylates and methacrylates such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

In certain embodiments, polymer supports are derived from the polymerisation of monomers selected from styrene and substituted styrenes, divinylbenzene, esters of acrylic, esters of methacrylic acid, alkyl esters of mono-olefinically unsaturated dicarboxylic acids, vinyl esters of carboxylic acids, acrylamides, methacrylamides and functional derivatives thereof. Preferred polymer supports are derived form the polymerisation of monomers selected from styrene and substituted styrenes, divinylbenzene, esters of acrylic acid and esters of methacrylic acid. Particularly preferred polymer supports are derived from the polymerisation of a mixture of styrene monomers, divinylbenzene monomers and methacrylate ester monomers, or are derived from the polymerisation of a mixture of styrene monomers, divinylbenzene monomers and acrylate ester monomers.

When polymer supports are derived from the polymerisation of compositions comprising monomers containing two or more polymerisable double bonds, the polymer support can exhibit varying degrees of crosslinking. The extent of crosslinking in these polymers can be expressed in percentage terms and corresponds to the number of moles of polymerisable double bonds derived from monomers containing two or more polymerisable double bonds as a percentage of the total number of moles of polymerisable double bonds.

Where the polymer support of the scavenger resin exhibits only low levels of crosslinking, such as from 1% to 5%, or commonly from 1% to 3%, these crosslinked scavenger resins are routinely contacted with solvents which cause the scavenger resin to swell. Such scavenger resins are frequently referred to as microporous resins.

In many embodiments, the microporous resin is swelled in the solvent of choice to allow ready access to the functional groups on the resin. Solvents of choice can be predicted by considering the polymer composition and are often those solvents which would be "good solvents" for a theoretical linear polymer which may be made from a similar composition but with no crosslinking agent present.

Preferred swell ratios for a microporous resin fall in the range of from 5 to 20. The swell ratio is defined as:

$$\text{Swell Ratio} = \frac{Vol_{final} - Vol_{initial}}{Vol_{initial}}$$

$Vol_{final}$=Final volume occupied by resin after allowing the resin to fully swell in a given solvent.

$Vol_{initial}$=Initial dry bed volume of resin.

Where the polymer support of the scavenger resin exhibits higher levels of crosslinking, such as from 20% to 90%, or commonly from 30% to 80%, these highly crosslinked scavenger resins often have permanent porosity thus access of reagents to the pendant groups attached to the polymer support is mainly independent of solvents. Such scavenger resins are frequently referred to as macroporous resins.

The term macroporous indicates a class of resins which have a permanent well developed porous structure. Importantly, these resins can have much higher surface areas (as measured by nitrogen BET) in the dry state than gel type resins. Typically, surface areas in the dry state can range from 50 to 1000 m²/g. Although there is no universally accepted definition of a macroporous resin, in the case of styrene-DVB resins it has been suggested that a macroporous resin may be defined as resin which in the dry state when exposed to cyclohexane exhibits a cyclohexane uptake of at least 0.1 m²g⁻¹ over 16 h (Millar, J. R. et. al., *J. Chem. Soc.*, 1996, 218.).

Macroporous resins are often formed when the composition comprising monomers containing two or more polymerisable double bonds is polymerised in the presence of a porogen. The porogen causes phase separation of the polymer matrix. Removal of the porogen and drying yields rigid, opaque, permanently porous beads. Phase separation is controlled by the nature and level of the porogen employed, and the level of crosslinking agent employed.

The selection of monomers and/or crosslinking agents from which the scavenger resin is derived may in part be dictated by the desired morphology of the scavenger resin, and the solvent or reaction systems in which the scavenger resins will be employed. The relationships between morphology and monomer compositions are reviewed in Sherrington, D. C., *J. Chem. Soc., Chem Commun.*, 1998, 2275, of which the teaching of pages 2278 to 2284 are incorporated herein by reference.

Where the pendant 1,3-ketoester or 1,3-ketoamide groups are attached either directly or by means of a linker to the polymer support, the attachment is made to the repeat units of the polymer support. Where the polymer support is derived from more than one monomer type, there will be more than one type of repeat unit. Preferably the 1,3-ketoester or 1,3-ketoamide groups are attached either directly or by means of a linker to only one type of repeat unit. Preferably the repeat unit to which the 1,3-ketoester or 1,3-ketoamide groups are attached either directly or by means of a linker is derived from a single monomer type which is a methacrylate or acrylate derived monomer.

Preferably, where the pendant 1,3-ketoester or 1,3-ketoamide group are attached by means of a linker to the polymer support, the scavenger resin is derived from the polymerisation of a composition comprising a functionalised monomer comprising pendant 1,3-ketoester or 1,3-ketoamide groups attached by means of a linker to a single monomer type. More preferably, the scavenger resin is derived from the polymerisation of a composition comprising two or more monomers, wherein at least one monomer is a functionalised monomer comprising pendant 1,3-ketoester or 1,3-ketoamide groups attached by means of a linker to a single monomer type. Most preferably the scavenger resin is derived from the polymerisation of a composition comprising one or more monomers containing only one polymerisable double bond, one or more monomers containing two or more polymerisable double bonds, and a functionalised monomer comprising pendant 1,3-ketoester or 1,3-ketoamide groups attached by means of a linker to a single monomer type. Polymer supports derived from the polymerisation of a composition comprising one or two monomers containing only one polymerisable double bond, one monomer containing two or three polymerisable double bonds and a functionalised monomer comprising pendant 1,3-ketoester or 1,3-ketoamide groups attached by means of a linker to a single monomer type are highly preferred.

Scavenger resins may be derived from the polymerisation of compositions comprising a functionalised monomer comprising pendant 1,3-ketoester or 1,3-ketoamide groups attached by means of a linker to a single monomer type, and one or more monomers selected from the group comprising styrene and substituted styrenes, such as α-methyl styrene, methyl styrene, t-butyl styrene, bromo styrene and acetoxy styrene; alkyl esters of mono-olefinically unsaturated dicarboxylic acids, such as di-n-butyl maleate and di-n-butyl fumarate; vinyl esters of carboxylic acids such as vinyl acetate, vinyl propionate, vinyl laurate and vinyl esters of versatic acid such as VeoVa 9 and VeoVa 10 (VeoVa is a trademark of Shell); acrylamides such as methyl acrylamide and ethyl acrylamide; methacrylamides such as methyl methacrylamide and ethyl methacrylamide; nitrile monomers such as acrylonitrile and methacrylonitrile; esters of acrylic and methacrylic acid, preferably optionally substituted $C_{1-20}$alkyl and $C_{1-20}$cycloalky esters of acrylic and methacrylic acid, such as methyl acrylate, ethyl acrylate, n-butyl acrylate, 2ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate and N,N-dimethylaminoethyl methacrylate; divinylbenzene; trivinylbenzene; and multifunctional acrylates and methacrylates such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine. The single monomer type to which the pendant 1,3-ketoester or 1,3-ketoamide groups are attached by means of a linker is preferably a methacrylate or acrylate derived monomer unit.

Preferably the functionalised monomer comprising pendant 1,3-ketoester or 1,3ketoamide groups has the general formula 2:

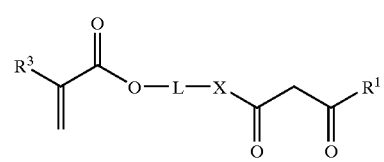

(2)

wherein

X, $R^1$ and $R^2$ are as defined herein before above;

$R^3$ is an optionally substituted hydrocarbyl, perhalogenated hydrocarbyl or heterocyclyl group; and L is a linking group.

Optionally substituted hydrocarbyl, perhalogenated hydrocarbyl or heterocyclyl groups which may be represented by $R^3$ are as defined for $R^1$ above.

Linking groups which may be represented by L include optionally substituted methylene, polymethylene, ether, polyether or cyclic bridging units.

Methylene and polymethylene bridging units which may be represented by L include linear and branched alkylene chains comprising up to 20 carbon atoms, particularly from 1 to 7 carbon atoms and preferably from 1 to 5 carbon atoms. When the alkyl groups are branched, the groups often comprise up to 10 branched chain carbon atoms, preferably up to 4 branched chain atoms. Examples of alkylene chains which may be represented by L include —CH₂—, —CH₂CH₂—, —(CH₂)₃—, —CH₂CH(CH₃)—, and —CH₂C(CH₃)₂—chains.

Ether and polyether bridging units which may be represented by L include linear and branched alkylene-oxy-alkylene chains or poly(alkyleneoxy)-alkylene chains comprising up to 150 carbon atoms and up to 40 oxygen atoms, particularly from 2 to 15 carbon atoms and from 1 to 4 oxygen atoms, and preferably from 2 to 6 carbon atoms and from 1 to 2 oxygen atoms. Examples of alkylene-oxyalkylene chains or poly(alkyleneoxy)-alkylene chains which may be represented by L include —CH$_2$—O—CH$_2$—, —CH$_2$CH$_2$—O—CH$_2$CH$_2$—, —(CH$_2$)$_3$—O—(CH$_2$)$_3$—, —CH$_2$CH(CH$_3$)—O—CH$_2$CH$_2$—, —CH$_2$CH(CH$_3$)—O—CH$_2$CH(CH$_3$)— chains, and also —[CH$_2$CH$_2$—O)]$_n$—CH$_2$CH$_2$— and —[CH$_2$CH(CH$_3$)—O]$_n$—CH$_2$CH(CH$_3$)— chains where n=2, 3 or 4.

Cyclic bridging units which may be represented by L include aromatic, saturated and partially unsaturated ring systems and may constitute 1 ring or 2 or more fused rings which may include cycloalkyl, aryl or heterocyclic rings. In certain embodiments, cycloalkyl and aryl rings commonly comprise from 3 to 10 carbon atoms in the largest ring, and heterocyclic rings commonly comprise from 3 to 7 ring atoms in which at least one atom is carbon and at least one atom is any of N, O, S or P. Examples of aromatic, saturated and partially unsaturated ring systems which may be represented by L include —CH$_2$C$_6$H$_4$CH$_2$— and —CH$_2$C$_6$H$_{10}$CH$_2$—.

Examples of functionalised monomers comprising pendant 1,3-ketoester or 1,3ketoamide groups include:

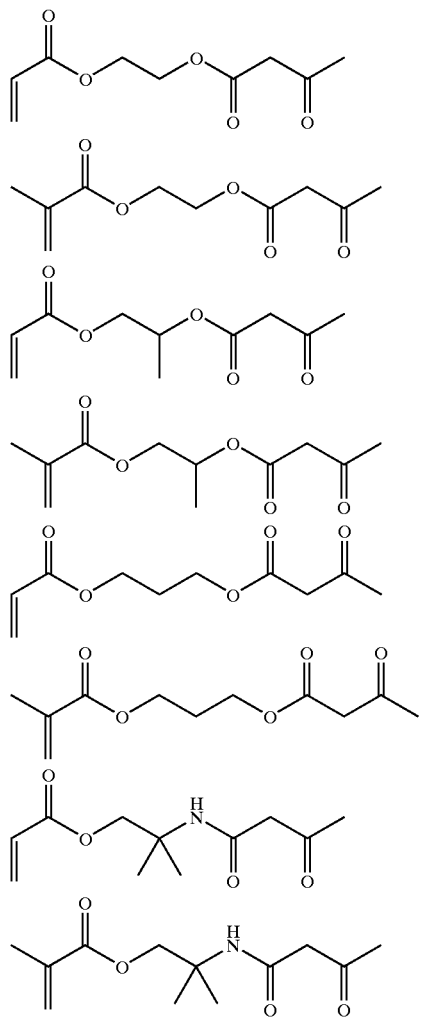

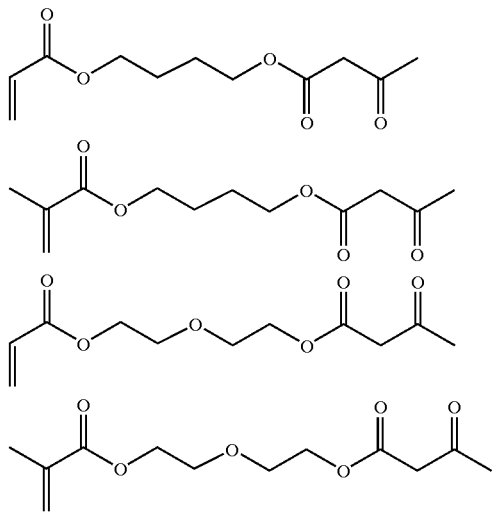

In certain highly preferred embodiments the functionalised monomer comprising pendant 1,3-ketoester or 1,3-ketoamide groups attached by means of a linker to a single monomer type is acetoacetoxyethyl methacrylate having the formula:

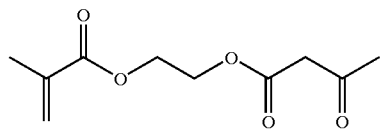

In a preferred embodiment, scavenger resins are derived from the polymerisation of compositions comprising a functionalised monomer comprising pendant 1,3-ketoester or 1,3-ketoamide groups selected from the group consisting of monomers having the formulae:

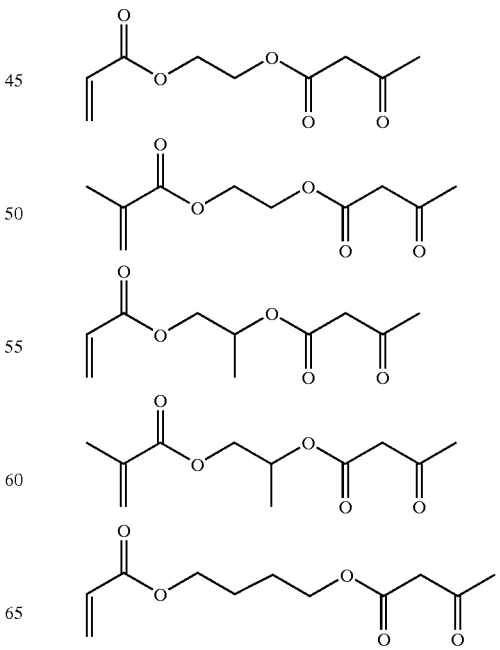

-continued

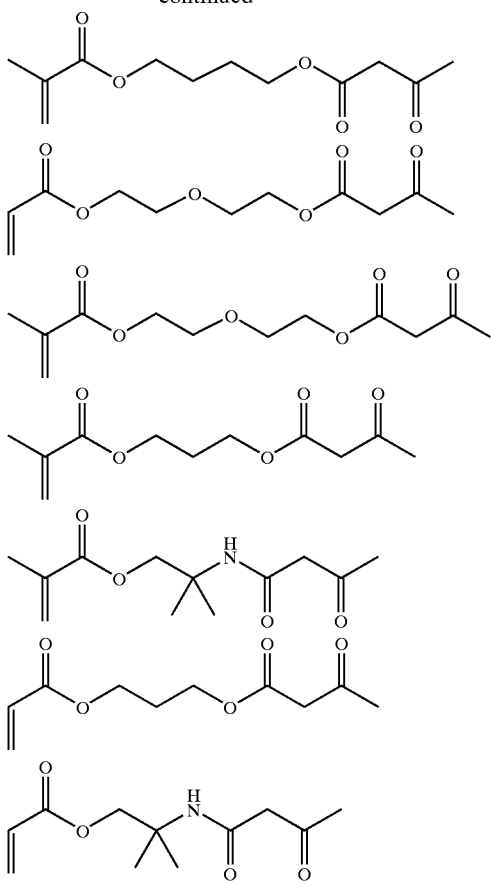

and one or more monomers selected from the group consisting of styrene and substituted styrenes, such as α-methyl styrene, methyl styrene, t-butyl styrene, bromo styrene and acetoxy styrene; alkyl esters of mono-olefinically unsaturated dicarboxylic acids, such as di-n-butyl maleate and di-n-butyl fumarate; vinyl esters of carboxylic acids such as vinyl acetate, vinyl propionate, vinyl laurate and vinyl esters of versatic acid such as VeoVa 9 and VeoVa 10 (VeoVa is a trademark of Shell); acrylamides such as methyl acrylamide and ethyl acrylamide; methacrylamides such as methyl methacrylamide and ethyl methacrylamide; nitrile monomers such as acrylonitrile and methacrylonitrile; esters of acrylic and methacrylic acid, preferably optionally substituted $C_{1-20}$alkyl and $C_{1-20}$cycloalky esters of acrylic and methacrylic acid, such as methyl acrylate, ethyl acrylate, n-butyl acrylate, 2-ethylhexyl acrylate, i-propyl acrylate, and n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate and N,N-dimethylaminoethyl methacrylate; divinylbenzene; trivinylbenzene; and multifunctional acrylates and methacrylates such as ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

In a more preferred embodiment, scavenger resins are derived from the polymerisation of compositions comprising one or more monomers selected from the group consisting of acetoacetoxyethyl acrylate, acetoacetoxyethyl methacrylate, acetoacetoxypropyl acrylate, and acetoacetoxypropyl methacrylate, one or more monomers selected from the group consisting of styrene, methyl acrylate, ethyl acrylate, methyl methacrylate, ethyl acrylate, and one or more monomers selected from the group consisting of divinylbenzene, trivinylbenzene ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

In a highly preferred embodiment, scavenger resins are derived from the polymerisation of compositions comprising acetoacetoxyethyl methacrylate, styrene and divinylbenzene.

Where the scavenger resin is derived from the polymerisation of a composition comprising one or two monomers containing only one polymerisable double bonds, one monomer containing two or three polymerisable double bonds, and a functionalised monomer of general formula (2), the mole ratio of the total number of moles of monomers containing only one polymerisable double bonds:functionalised monomer of general formula (2) may be from 100:1 to 1:100, is preferably from 70:30 to 1:99 and most preferably is from 60:40 to 15:85. The level of crosslinking, as defined herein above, may be from 0.5% to 80%, preferably from 1% to 60% and most preferably from 1% to 40%.

When the scavenger resin is derived from the polymerisation of styrene, divinylbenzene and a functionalised monomer of general formula (2), the mole ratio of styrene: functionalised monomer of general formula (2) is often from 100:1 to 1:100, is preferably from 70:30 to 1:99 and most preferably is from 60:40 to 15:85. The level of crosslinking is often from 0.5% to 80%, preferably from 1% to 60% and most preferably from 1% to 40%.

Scavenger resins prepared from functionalised monomers comprising pendant 1,3-ketoester or 1,3-ketoamide groups are preferably produced as beads. The beads often range in size from diameters of 10 μm to 2000 μm, preferably from 50 μm to 1000 μm, and most preferably from 75 μm to 500 μm.

The scavenger resins may be prepared by an aqueous suspension polymerisation process, for example as described in Journal of Applied Polymer Science, 1982, 27, 133–138. The monomers can be suspended as droplets often of diameter from 1 μm to 1000 μm in water. Preferably stabilisers are added to prevent agglomeration of the droplets. Examples of stabilisers which may be added include polyvinyl alcohol, polyacrylic acid, polyvinyl pyrrolidone, polyalkylene oxide, barium sulphate, magnesium sulphate and sodium sulphate. Agitation of the suspension is preferably employed. The method of agitation employed may help to assist in maintaining the suspension. A free radical initiator commonly serves to initiate polymerisation. The free radical initiator employed is selected according to the types of monomers present. Examples of free radical initiators which may be used to prepare scavenger resins which may be employed in processes of the present invention include benzoyl peroxide, dioctanoyl peroxide, 2,2'-azobisisobutyronitrile and 2,2'-azobis(2,4-dimethylvaleronitrile). The selection of a suitable temperature range may be influenced by the nature of the monomers and the initiator present. Polymerisation of the monomers is commonly carried out at temperatures ranging from 15 to 160° C., preferably from 50 to 90° C. The resultant scavenger resin may be isolated by filtration, optionally washed with one or more solvents. Suitable solvents for washing the scavenger resin include tetrahydrofuran, methanol and water. The resultant scavenger resin may be dried and the beads classified according to size by for example sieving.

The process of the present invention may be carried out in the presence of a solvent. Suitable solvents include any solvent capable of swelling the crosslinked resin or for macroporous resins, any solvent capable of entering the pores. Suitable solvents may be selected from polar, non-polar, protic and aprotic solvents. Examples of suitable solvents include $CH_2Cl_2$, toluene, THF, methanol, dimethylformamide, propan-2-ol, and mixtures thereof. Propan-2-ol is a preferred solvent.

In the process of the present invention, the scavenger resin can, through reaction of the carbonyl groups present, act as an electrophilic reagent removing nucleophiles, particularly primary amines, from solution. However, the scavenger resin may act as a nucleophilic reagent removing electrophiles from solution by, for example, reaction of the electrophile with the active methylene functionality.

According to a second aspect of the present invention there is provided a process for removing of electrophiles from solution wherein a solution comprising an electrophile is contacted with a scavenger resin, whereby the scavenger resin binds to at least a some of the electrophile in solution thereby decreasing levels of electrophile in solution characterised in that the scavenger resin comprises pendant groups selected from 1,3ketoesters or 1,3-ketoamides or mixtures thereof attached to a polymer support.

Scavenger resins which may be employed in the second aspect of the present invention include the scavenger resins as hereinbefore described in the first aspect of the present invention.

In the process of the present invention, the scavenger resin may be added to a solution comprising an electrophile. The resin is then separated from the solution, preferably by filtration, the contact time being such as to allow for at least partial depletion of electrophile in solution. Alternatively, a solution comprising an electrophile is passed through a mass or column of resin, the dwell time being such as to allow for at least partial depletion of electrophile in solution. Contact or dwell time can be determined by monitoring reductions in levels of electrophile in solution.

The process of the present invention may be carried out at temperatures ranging from −100 to 250° C., preferably from −10 to 100° C., more preferably from 10 to 40° C. and most preferably at ambient temperature, for example from 15 to 30° C.

In the process of the present invention, sufficient scavenger resin is employed to effect the removal of substantially all the electrophile. The ratio of scavenger resin to electrophile solution employed will be in direct relation to the concentration of electrophile present and percentage 1,3-ketoester or 1,3-ketoamide active functionality. The ratio of molar concentration of 1,3-ketoester or 1,3-ketoamide active functionality on the scavenger resin to molar concentration of electrophile in solution may be in the range from 1:1 to 100:1. Preferably an excess of 1,3-ketoester and/or 1,3-ketoamide active functionality is employed, for example ratios in the range of 1:1 to 20:1 or more preferably in the range of 1:1 to 4:1. Such excesses may promote effective and fast removal of the electrohpile.

Electrophiles which may effectively be removed by the process of the present invention, include those electrophiles which undergo reaction with active methylene compounds to form covalently bonded species linking the electrophile to the active methylene compound. Examples of electrophiles include formaldehyde, aldehydes, isocyanates, diazonium salts.

The process of the present invention may be carried out in the presence of a solvent. Suitable solvents include any solvent capable of swelling the crosslinked resin or for macroporous resins, any solvent capable of entering the pores. Suitable solvents may be selected from polar, non-polar, protic and aprotic solvents, especially aprotic solvents. Examples of suitable solvents include $CH_2Cl_2$, toluene, THF, dimethylformamide, and mixtures thereof. Trimethyl orthoformate is a preferred solvent The scavenger resins of the present invention may find further application in solid phase synthesis whereby nucleophiles or electrophiles which react with the scavenger resins may optionally be subjected to further reactions while attached to the scavenger resin. The nucleophile, electrophile or further derivative product may be isolated by cleavage of the product from the scavenger resin by chemical, enzymatic or other means.

The present invention also provides scavenger resins as defined in claims 3 to 9 and as defined in the first and second aspects of the present invention. Preferences for the scavenger resins are as defined for the scavenger resins employed in the first and second aspects of the present invention. Especially preferred scavengers resins are those scavenger resins employed in the first and second aspects of the present invention which are obtainable by aqueous suspension polymerisation, more preferably obtainable by the aqueous suspension polymerisation processes described with respect to the first aspect of the present invention. Many preferred scavenger resins comprise pendant groups which are reactive with both electrophiles and nucleophiles. Scavenger resins of the present invention are preferably in the form of beads as herein before defined.

The invention is further illustrated, but not limited, by the following examples.

EXAMPLES

Example 1

Scavenger Resin Based on Acetoacetoxyethyl Methacrylate/Styrene/Divinylbenzene

Distilled water (5.5 liters), sodium sulphate (5.35 g) and an aqueous solution of AIRVOL 540 (200 g of 2.5% w/w polyvinyl alcohol, AIRVOL is a trade name of Air Products Ltd) were heated to 65° C. in a cylindrical 10 litre glass reactor and stirred with a stainless steel paddle shaped stirrer blade at 160 rpm. Acetoacetoxyethyl methacrylate (615.5 g) was added to a mixture of styrene (805.3 g), technical grade divinyl benzene (17.2 g), and Wako V-65 (14.4 g) (2,2'-Azobis (2,4-dimethylvaleronitrile), supplied by Wako Chemicals GmbH). This monomer mixture was poured into the reactor vessel and the whole mixture stirred at 160 rpm at 65° C. for 6 hours. The mixture was then poured into a 50 mm mesh 'top hat' filter and washed with tap water for 30 minutes. The wet beads were transferred to a beaker and allowed to stand for 16 hours in a 1:1 mixture of THF and distilled water (10 liters) before filtering through a sintered filter (porosity 2). The beads were washed three times with THF (6 liters), once with THF/methanol (2:1, 2.5 liters), once with THF/methanol (1:2, 2.5 liters, and three times with methanol (1.5 liters) before drying in a vacuum oven to constant weight.

The beads were classified by sieving, as shown:

| Sieve mesh size | | | |
|---|---|---|---|
| >500 mm | 134 g | 17.56% |
| 300–500 mm | 350.3 g | 45.92% |
| 150–300 mm | 273.3 g | 35.82% |
| >150 mm | 5.3 g | 0.69% |

The fraction in the range 150–300 mm was used subsequently. It had a swell ratio of 8.0 ml/g in THF. The FT-IR spectrum showed a strong band at 1722 cm−1 for the carbonyl group.

Example 2

Scavenger Resin Based on Acetoacetoxyethyl Methacrylate/Styrene/Divinylbenzene

Distilled water (5.5 liters), sodium sulphate (5.35 g) and an aqueous solution of AIRVOL 540 (200 g of 2.5% w/w polyvinyl alcohol, AIRVOL is a trade name belonging to Air Products Ltd) (200 g) were heated to 65° C. in a cylindrical 10 litre glass reactor and stirred with a stainless steel paddle shaped stirrer blade at 160 rpm. Acetoacetoxyethyl methacrylate (932.5 g) was added to a mixture of styrene (486.4 g), technical grade divinyl benzene (19.0 g), and Wako V-65 (14.4 g) (2,2'-Azobis (2,4-dimethylvaleronitrile), supplied by Wako Chemicals GmbH). This monomer mixture was poured into the reactor vessel and the whole mixture stirred at 165 rpm at 65° C. for 6 hours. The mixture was then poured into a 50 mm mesh 'top hat' filter and washed with tap water for 30 minutes. The wet beads were transferred to a beaker and allowed to stand for 16 hours in a 1:1 mixture of THF and distilled water (10 liters) before filtering through a sintered filter (porosity 2). The beads were washed three times with THF (6 liters), once with THF/methanol (2:1, 2.5 liters), once with THF/methanol (1:2, 2.5 liters), and three times with methanol (1.5 liters) before drying in a vacuum oven to constant weight.

The beads were classified by sieving, as shown:

| Sieve mesh size | | | |
|---|---|---|---|
| >500 mm | 23.7 g | 1.95% |
| 300–500 mm | 193.1 g | 15.87% |
| 150–300 mm | 899.8 g | 73.97% |
| <150 mm | 99.8 g | 8.21% |

The fraction in the range 150–300 mm was used subsequently. It had a swell ratio of 6.5 ml/g in THF. The FT-IR spectrum showed a strong band at 1722 cm−1 for the carbonyl group.

Example 3

Macroporous Scavenger Resins, Effects of Varying Diluent and Crosslinker

To a 1.5 l stirred flange flask, fitted with condenser and purged with nitrogen, was added an aqueous phase comprising distilled water (1130 ml), sodium sulphate (0.77 g), and an aqueous solution of AIRVOL 540 (29 ml of 2.5% w/w polyvinyl alcohol). A monomer phase comprising acetoacetoxyethyl methacrylate (118.9 g), divinylbenzene (80.5 g of 80% purity), diluent (100.0 g, see Table 1), and Wako V65 (1.9 g) (2,2'-Azobis (2,4-dimethylvaleronitrile) was made up in a 1 l conical flask. The monomer phase was transferred to the flange flask at 65° C. whilst stirring at 420 r.p.m. The reaction mixture was stirred for five hours then allowed to cool. The beads were recovered by filtration followed by sequential washing with water (4×1 l), THF (3×500 ml), THF/MeOH (400 ml:200 ml), THF/MeOH (200 ml:400 ml) and MeOH (2×400 ml). The beads were then dried in the vacuum oven at 65° C.

A sample of the beads were analysed by Nitrogen BET using a Micrometrics Tristar 3000 to determine surface area and were analysed by mercury intrusion using a Micrometrics Autopore 9220 to determine pore size distribution.

TABLE 1 summarises the effect of different diluents on the surface area and pore dimensions:

| Diluent | DVB % | Surface Area ($m^2/g$) | Average Pore Diameter (Å) | Total Pore Volume ($cm^3/g$) | % Pore Size Distribution | | |
|---|---|---|---|---|---|---|---|
| | | | | | 30–300 Å | 300–1000 Å | 1000 Å |
| heptane | 40 | 2.05 | 191.50 | 0.0098 | 1.1 | 33.8 | 65.1 |
| heptane | 20 | 2.72 | 220.96 | 0.0150 | 8.5 | 14.7 | 76.8 |
| decanol | 40 | 71.80 | 218.94 | 0.3930 | 18.1 | 21.0 | 60.9 |

Example 4

Comparison of Reactivity of Scavenger Resin with Primary and Secondary Amines Under Varying Temperature and Solvent Conditions To a solution of benzylamine (1.5 mmol) and a secondary amine (2.6 mmol of either N-benzylmethylamine or dibenzylamine) in solvent was added a portion of the scavenger resin prepared according to Example 2 (see Table 2). An aliquot of the solution (10 µl) was taken from the suspension at time intervals and diluted with acetonitrile (to 1 ml). The sample was analyzed by HPLC to determine the extent of removal of the benzylamine as a function of time. HPLC conditions: Gradient from water (0.1% TFA) to MeCN (0.042% TFA) over 20 minutes; I=254 nm. Benzylamine ($t_R$ 6.9 min.); N-Benzylmethylamine ($t_R$ 7.2 min.); dibenzylamine ($t_R$ 9.7 min.)

Two pairs of amines were studied: benzylamine (BnNH2)/N-benzylmethylamine (BnNHMe) and benzylamine/dibenzylamine. The two pairs of amines were reacted with the scavenger resin in two different solvents, 2-propanol (2-PrOH) or tetrahydrofuran (THF), and at different temperatures. The results are shown in Table 3, 4 and 5. The primary amine, benzylamine, was removed from solution whereas the secondary amines, N-benzylmethylamine or dibenzylamine remained primarily in solution under the same conditions. The rate of removal of primary amine at room temperature was much slower than at 40° C. The reaction of primary amine with scavenger resin was influenced by solvent. In general, more primary amine was removed from solution when 2-propanol was employed as solvent than when tetrahydrofuran is employed. The results show that scavenger resin has high selectivity for the primary amine, benzylamine.

TABLE 2

Experimental Conditions employed in Experiments to show the removal of benzylamine in the presence of secondary amines with Scavenger Resin

| | Expt. | | | | | | | |
|---|---|---|---|---|---|---|---|---|
| | A | B | C | D | E | F | G | H |
| Solvents (ml) | 2-PrOH (8.0) | 2-PrOH (8.0) | THF (8.0) | MeOH/DCM (1:1 v/v) (4.0) | MeOH (4.0) | MeOH/DCM (1:1 v/v) (4.0) | 2-PrOH (4.0) | MeOH (4.0) |
| Temp (° C.) | 40 | 20 | 20 | 20 | 20 | 20 | 20 | 20 |
| Molar ratio (BnNH$_2$/resin) | 2 | 2 | 2 | 2 | 4 | 4 | 4 | 2 |

TABLE 3

Results of removal of benzylamine in the presence of dibenzylamine

| Time (hour) | Ratio (BnNH$_2$/Bn$_2$NH, %) | | | Content of BnNH$_2$ (%) | | | Content of Bn$_2$NH (%) | | |
|---|---|---|---|---|---|---|---|---|---|
| | A | B | C | A | B | C | A | B | C |
| 0 | 22.24 | 17.2 | 20.81 | 100 | 100 | 100 | 100 | 100 | 100 |
| 1 | 7.79 | 14.0 | 16.8 | 28.77 | 69.13 | 87.66 | 82.12 | 84.65 | 100 |
| 2 | 5.88 | 12.55 | 13.63 | 21.62 | 66 | 69.58 | 81.8 | 87.34 | 100 |
| 4 | 2.55 | 10.7 | 11.62 | 9.37 | 54.9 | 61.86 | 81.77 | 86.32 | 100 |
| 6 | 1.6 | 7.83 | 8.96 | 5.82 | 39.14 | 45.78 | 80.78 | 81.12 | 100 |
| 7 | 1.41 | 6.86 | 6.41 | 5.23 | 34.2 | 33.77 | 82.54 | 85.55 | 100 |
| 9 | 1.05 | 3.09 | 4.77 | 3.91 | 14.78 | 24.93 | 83.16 | 82.05 | 100 |

TABLE 4

Results of removal of benzylamine in the presence of N-benzylmethylamine

| Time (hour) | Ratio (BnNH$_2$/BnNHMe, %) | | | Content of BnNH$_2$ (%) | | | Content of BnNHMe (%) | | |
|---|---|---|---|---|---|---|---|---|---|
| | A | B | C | A | B | C | A | B | C |
| 0 | 23.5 | 23.5 | 21.8 | 100 | 100 | 100 | 100 | 100 | 100 |
| 1 | 15.2 | 21.6 | 19.4 | 53.5 | 93.7 | 89.2 | 82.9 | 100 | 100 |
| 2 | 10.4 | 20.1 | 17.8 | 39.2 | 86.0 | 83.4 | 88.4 | 100 | 100 |
| 4 | 5.87 | 17.5 | 15.2 | 20.4 | 71.6 | 72.8 | 81.5 | 95.0 | 99.8 |
| 6 | 3.98 | 16.6 | 13.9 | 13.9 | 53.2 | 61.7 | 81.9 | 81.8 | 99.4 |
| 7 | 3.0 | 14.1 | 13.4 | 9.99 | 48.3 | 56.7 | 78.1 | 80.8 | 92.4 |
| 9 | 2.9 | 12.7 | 11.8 | 9.43 | 48.6 | 52.7 | 76.3 | 90.1 | 96.9 |

TABLE 5

Results of removal of benzylamine in the presence of N-benzylmethylamine

| Time (hour) | Ratio (BnNH$_2$/BnNHMe, %) | | | | | | | | |
|---|---|---|---|---|---|---|---|---|---|
| | D | E | F | G | H | D | E | F | G | H |
| 0 | 37.0 | 35.2 | 29.5 | 32.6 | 29.2 | | | | | |
| 1 | 31.8 | 14.2 | 18.2 | 22.7 | 17.6 | | | | | |
| 2 | 28.4 | 9.67 | 14.5 | 16.1 | 13.6 | | | | | |
| 3 | 21.5 | 6.07 | 12.9 | 13.2 | 11.3 | | | | | |
| 4 | | 6.04 | | | | | | | | |
| 5 | 16.3 | | 9.03 | 9.02 | 8.36 | | | | | |
| 6 | 14.7 | 3.78 | 7.37 | 7.74 | 6.85 | | | | | |
| 7 | 13.6 | 2.67 | 6.54 | 6.36 | 6.08 | | | | | |
| 8 | 12.3 | 1.53 | 5.60 | 4.56 | | | | | | |
| 9 | 11.3 | 2.21 | 5.04 | 2.78 | 4.36 | | | | | |
| 10 | 11.0 | 1.28 | 4.10 | | | | | | | |
| 11 | 10.3 | 0.83 | | 2.67 | 3.03 | | | | | |
| 24 | 6.81 | 1.45 | 0.49 | 0.81 | 2.42 | | | | | |
| 30 | 5.0 | 0.94 | 0.48 | 0 | 1.62 | | | | | |

Table 6 shows the effect of solvent on the removal of benzylamine in a mixture of N-benzylmethylamine and benzylamine. Benzylamine is selectively removed in all the solvents systems. 2-Propanol gave much better results than methanol while a mixture of 2-propanol and tetrahydrofuran or dichloromethane (DCM) gave slightly better purities and recoveries for the secondary amine, N-benzylmethylamine.

TABLE 6

[a]Effects of Solvents on Removal of BnNH2 in a Mixture of BnNHMe/BnNH2

| Solvents | Purity (%, HPLC)[b] | Recovery of BnNHMe (%) |
|---|---|---|
| MeOH | 93 | 41 |
| MeOH/DCM(1:1) | 95 | 71 |
| 2-PrOH | 96 | 72 |
| 2-PrOH/DCM (1:1) | 100 | 65 |
| 2-PrOH/THF (1:1) | 100 | 69 |

[a]Conditions: Solvent: 4.0 ml;
2 molar eq. of Scavenger Resin relative to benzylamine;
Time: 48 hours; room temperature;
$BnNH_2BnNHMe$ (80 mg/140 mg)
[b]Ratio of BnNHMe/(BnNHMe + $BnNH_2$)

Example 5

Use of Scavenger Resin to Remove Excess Primary Amine in a Reductive Alkylation reaction Several secondary amines were individually prepared by reductive alkylation as shown in Scheme 1.

TABLE 7

Results on Reductive Alkylation

| | Solvents | | | Purity | Yield |
|---|---|---|---|---|---|
| R1 | step a + b | step c[a] | Compound | (%) | (%) |
| Phenyl | 2-PrOH | 2-PrOH/THF | 3 | 100[b] | 60 |
| 2-Furyl | 2-PrOH | 2-PrOH/THF | 3 | 100[b] | 68 |
| Benzyl | 2-PrOH | 2-PrOH/THF | 3 | 100[b] | 70 |
| Diphenyl | 2-PrOH | 2-PrOH/THF | 3 | 97[b] | 63 |
| 1-Naphthyl | 2-PrOH | 2-PrOH/THF | 3 | 100[b] | 56 |
| Benzhydryl | 2-PrOH | 2-PrOH/THF | 3 | 98[b] | 54 |
| Phenyl | MeOH | MeOH/DCM | 4 | 100[c] | 81 |
| 2-Furyl | MeOH | MeOH/DCM | 4 | 100[b] | 88 |
| Benzyl | MeOH | MeOH/DCM | 4 | 100[c] | 87 |
| Diphenyl | MeOH | MeOH/DCM | 4 | 87[b] | 80 |
| 1-Naphthyl | MeOH | MeOH/DCM | 4 | 100[b] | 72 |
| Benzhydryl | MeOH | MeOH/DCM | 4 | 93[b] | 69 |

[a]ratio 1/1 (v/v)
[b]purity obtained by $^1H$ NMR
[c]purity obtained by HPLC

Example 6

Removal of an Elecrophile from Solution by the Scavenger Resin

The scavenger resin prepared in Example 2 was tested as a scavenger for aromatic aldehydes. The basis of the test is

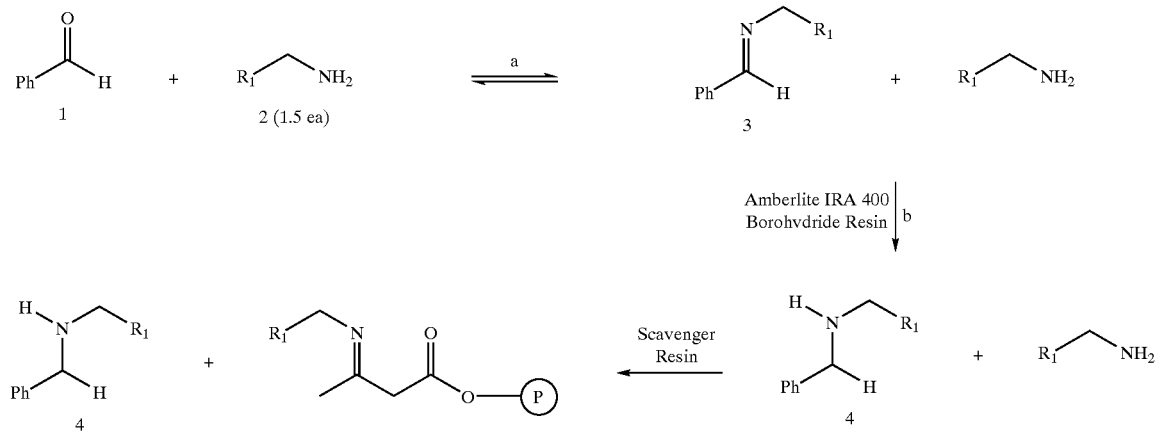

Scheme 1 a) 2-PrOH or MeOH, 20° C., 2 h; b) 2-PrOH or MeOH, 20° C., 24 h, Amberlite IRA 400 Borohydride resin (2 eq.); c) 2-PrOH/THF or MeOH/CH$_2$Cl$_2$ (1:1, v/v), 36 h, 20° C., Scavenger resin (2 eq.)

In each reaction, benzaldehyde was reacted with a primary amine selected from benzylamine, 2-furylmethylamine, 2-phenylethylamine, 1-naphthylmethylamine, 2,2-diphenylethylamine, and diphenylmethylamine to give the corresponding imine. Propan-2-ol or methanol were used as solvents for this reaction. The reduction of the imines (3) to give the corresponding secondary amines was solvent dependent, methanol proving to be much more rapid than in propan-2-ol. The reaction of the resulting primary and secondary amine mixture with the Scavenger Resin prepared in Example 1 was then either carried out in propan-2-ol/tetrahydrofuran or in methanol/dichloromethane. The results obtained are given in Table 7.

the Knoevenagel condensation, reaction of an active methylene compound with an aldehyde in the presence of a base and is outlined in the scheme below:

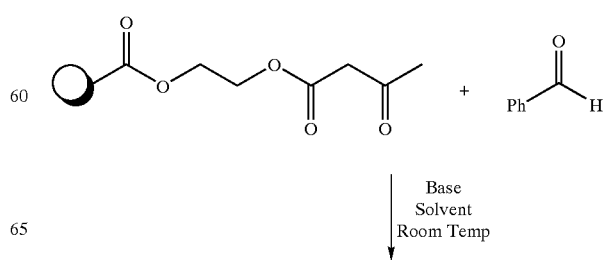

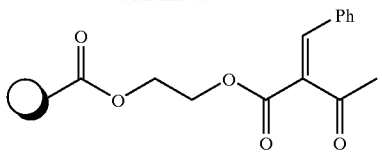

To a solution of benzaldehyde (0.5 mmol) and base (see Table 8) in solvent (8.0 ml) was added scavenger resin (1.0 g, 3.0 mmol) prepared according to Example 2. Aliquots of the solution (10 μl) were taken from the suspension at time intervals and diluted with acetonitrile (to 1.0 ml). The samples were analysed by HPLC to determine the extent of removal of the benzaldehyde as a function of time. HPLC conditions used were: Gradient from water (0.1% TFA) to MeCN (0.042% TFA) over 20 minutes. Benzaldehyde (tR 12.3 min.).

The results are shown in Table 9.

TABLE 8

Solvents and Base employed in Experiments to show the removal of benzaldehyde with scavenger resin

| Experiment | Solvent | Base* |
| --- | --- | --- |
| A | dichloromethane | 2.4 eq. piperidine acetate |
| B | trimethyl orthoformate | 1 eq. piperidine acetate |

*Equivalent to benzaldehyde

TABLE 9

Results showing removal of benzaldehyde with scavenger resin

| Time (h) | Percentage Benzaldehyde (%) | |
| --- | --- | --- |
| | A | B |
| 0 | 100 | 100 |
| 1 | 31.4 | 25.7 |
| 3 | 23.5 | 10.2 |
| 5 | 24.1 | 6.6 |
| 7 | 27.8 | 5.8 |
| 9 | 28.1 | 5.3 |
| 24 | 31.9 | 5.4 |
| 48 | 18.4 | 4.3 |

What is claimed is:

1. A process for removing primary amines from solution wherein a solution comprising a primary amine is contacted with an insoluble, non-film forming scavenger resin, whereby the scavenger resin binds to at least some of the primary amine in solution thereby decreasing the amount of primary amine in solution, characterised in that the scavenger resin comprises pendant groups selected from 1,3-ketoesters or 1,3-ketoamides or mixtures thereof attached to a polymer support.

2. A process for removing of electrophiles from solution wherein a solution comprising an electrophile is contacted with an insoluble, non-film forming scavenger resin, whereby the scavenger resin binds to at least some of the electrophile in solution thereby decreasing levels of electrophile in solution characterised in that the scavenger resin comprises pendant groups selected from 1,3-ketoesters or 1,3-ketoamides or mixtures thereof attached to a polymer support.

3. An insoluble, non-film forming scavenger resin obtainable by the polymerisation of a composition comprising one or more monomers containing only one polymerisable double bond, one or more monomers containing two or more polymerisable double bonds, and a functionalised monomer comprising pendant 1,3-ketoester or 1,3-ketoamide groups attached by means of a linker to a single monomer type.

4. An insoluble, non-film forming, crosslinked polymer bead scavenger resin obtainable by aqueous suspension polymerisation of a composition comprising one or more monomers containing only one polymerisable double bond, one or more monomers containing two or more polymerisable double bonds, and a functionalised monomer comprising pendant 1,3-ketoester or 1,3-ketoamide groups attached by means of a linker to a single monomer type.

5. An insoluble, non-film forming scavenger resin according to either of claim 3 or claim 4 wherein a) the monomer(s) containing only one polymerisable double bond is selected from the group consisting of styrene and substituted styrenes; alkyl esters of mono-olefinically unsaturated dicarboxylic acids; vinyl esters of carboxylic acids and vinyl esters of versatic acid; acrylamides; methacrylamides; nitrile monomers; and esters of acrylic and methacrylic acid; and b) the monomer(s) containing two or more polymerisable double bonds is selected from the group consisting of divinylbenzene, trivinylbenzene, and multifunctional acrylates and methacrylates.

6. An insoluble, non-film forming scavenger resin according to claim 5 wherein a) the monomer(s) containing only one polymerisable double bond is selected from the group consisting of styrene, α-methyl styrene, methyl styrene, t-butyl styrene, bromo styrene, acetoxy styrene, di-n-butyl maleate, di-n-butyl fumarate, vinyl acetate, vinyl propionate, vinyl laurate, vinyl esters of versatic acid, methyl acrylamide, ethyl acrylamide, methyl methacrylamide, ethyl methacrylamide, acrylonitrile, methacrylonitrile, methyl acrylate, ethyl acrylate, n-butyl acrylate, 2-ethylhexyl acrylate, i-propyl acrylate, n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate, and N,N-dimethylaminoethyl methacrylate; and b) the monomer(s) containing two or more polymerisable double bonds is selected from the group consisting of divinylbenzene, trivinylbenzene, ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

7. An insoluble, non-film forming scavenger resin according to claim 3 or 4 wherein the functionalised monomer comprising pendant 1,3-ketoester or 1,3-ketoamide groups attached by means of a linker to a single monomer type has the general formula 2:

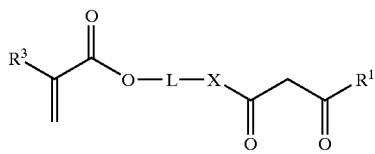

(2)

wherein

R¹ is an optionally substituted hydrocarbyl, perhalogenated hydrocarbyl or heterocyclyl group;

X is O or NR², wherein the free valence of O or NR² is bonded to a polymer support optionally via a linker;

R² is hydrogen, an optionally substituted hydrocarbyl, or heterocyclyl group;

R³ is an optionally substituted hydrocarbyl, perhalogenated hydrocarbyl or heterocyclyl group; and L is a linking group.

8. An insoluble, non-film forming scavenger resin according to claim 7 wherein L is selected from the group consisting of optionally substituted methylene, polymethylene, ether, polyether or cyclic bridging units.

9. An insoluble, non-film forming scavenger resin according to claim 8 wherein L is selected from the group consisting of optionally substituted linear and branched alkylene chains comprising up to 20 carbon atoms; optionally substituted linear and branched alkylene-oxy-alkylene chains or poly(alkyleneoxy)-alkylene chains comprising up to 150 carbon atoms and up to 40 oxygen atoms; and optionally substituted aromatic, saturated and partially unsaturated ring systems comprising from 3 to 10 carbon atoms in the largest ring.

10. An insoluble, non-film forming scavenger resin according to claim 9 wherein L is selected from the group consisting of —CH₂—, —CH₂CH₂—, —(CH₂)₃—, —CH₂CH(CH₃)—, —CH₂C(CH₃)₂—, —CH₂—O—CH₂—, —CH₂CH₂—O—CH₂CH₂—, —(CH₂)₃—O—(CH₂)₃, —, —CH₂CH(CH₃)—O—CH₂CH₂—, —CH₂CH(CH₃)—O—CH₂CH(CH₃)—chains, —[CH₂CH₂—O]ₙ—CH₂CH₂— and —[CH₂CH(CH₃)—O]ₙ—CH₂CH(CH₃)— chains where n=2, 3 or 4, —CH₂C₆H₄CH₂— and —CH₂C₆H₁₀CH₂.

11. An insoluble, non-film forming scavenger resin according to claim 7 wherein the functionalised monomer comprising pendant 1,3-ketoester or 1,3-ketoamide groups attached by means of a linker to a single monomer type is selected from the group consisting of the following

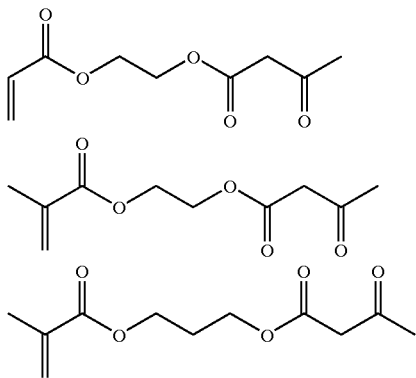

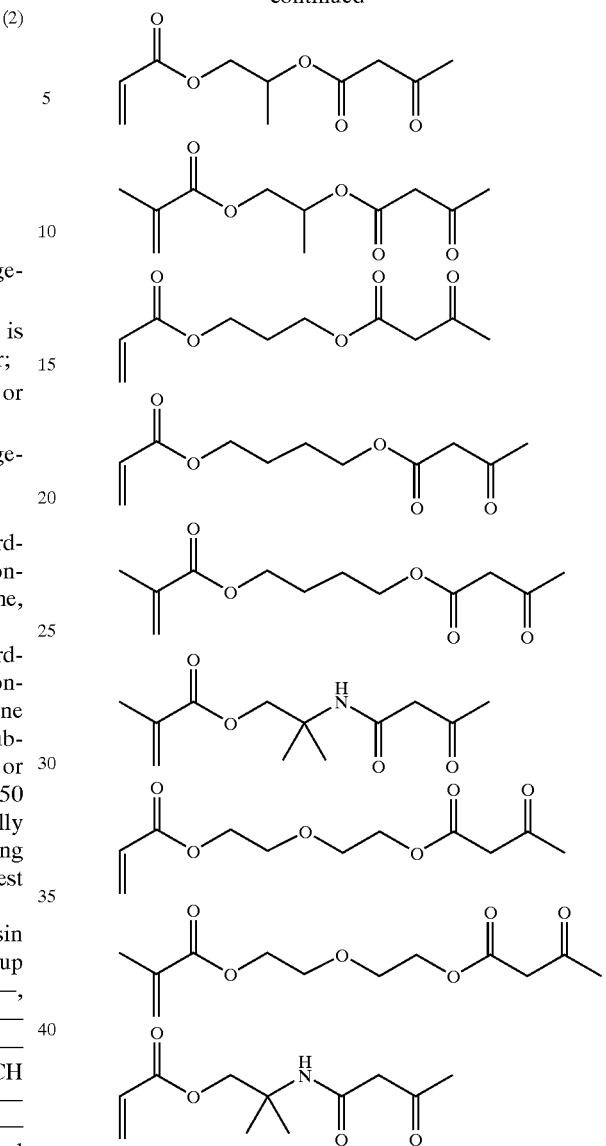

12. An insoluble, non-film forming scavenger resin according to claim 7 wherein the functionalised monomer comprising pendant 1,3-ketoester or 1,3-ketoamide groups attached by means of a linker to a single monomer type is acetoacetoxyethyl methacrylate.

13. An insoluble, non-film forming scavenger resin according to claim 3 or claim 4 wherein the composition comprises one or more monomers selected from the group consisting of acetoacetoxyethyl acrylate, acetoacetoxyethyl methacrylate, acetoacetoxypropyl acrylate, and acetoacetoxypropyl methacrylate, one or more monomers selected from the group consisting of styrene, methyl acrylate, ethyl acrylate, methyl methacrylate, ethyl acrylate, and one or more monomers selected from the group consisting of divinylbenzene, trivinylbenzene ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

14. An insoluble, non-film forming scavenger resin according to claim 13 wherein the composition comprises acetoacetoxyethyl methacrylate, styrene and divinylbenzene.

15. A process according to either of claim 1 or claim 2 wherein the insoluble, non-film forming scavenger resin is an insoluble, non-film forming scavenger resin obtainable by the polymerisation of a composition comprising one or more monomers containing only one polymerisable double bond, one or more monomers containing two or more polymerisable double bonds, and a functionalised monomer comprising pendant 1,3-ketoester or 1,3-ketoamide groups attached by means of a linker to a single monomer type.

16. A process according to claim 15 wherein
   a) the monomer(s) containing only one polymerisable double bond is selected from the group consisting of styrene, α-methyl styrene, methyl styrene, t-butyl styrene, bromo styrene, acetoxy styrene, di-n-butyl maleate, di-n-butyl fumarate, vinyl acetate, vinyl propionate, vinyl laurate, vinyl esters of versatic acid, methyl acrylamide, ethyl acrylamide, methyl methacrylamide, ethyl methacrylamide, acrylonitrile, methacrylonitrile, methyl acrylate, ethyl acrylate, n-butyl acrylate, 2-ethylhexyl acrylate, i-propyl acrylate, n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate, and N,N-dimethylaminoethyl methacrylate;
   b) the monomer(s) containing two or more polymerisable double bonds is selected from the group consisting of divinylbenzene, trivinylbenzene, ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine;
   c) and the functionalised monomer comprising pendant 1,3-ketoester or 1,3-ketoamide groups attached by means of a linker to a single monomer type has the general formula 2:

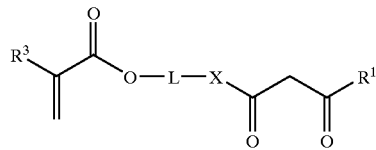

(2)

wherein
   $R^1$ is an optionally substituted hydrocarbyl, perhalogenated hydrocarbyl or heterocyclyl group;
   X is O or $NR^2$ wherein the free valence of O or $NR^2$ is bonded to a polymer support optionally via a linker;
   $R^2$ is hydrogen, an optionally substituted hydrocarbyl, or heterocyclyl group;
   $R^3$ is an optionally substituted hydrocarbyl, perhalogenated hydrocarbyl or heterocyclyl group; and
   L is a linking group.

17. A process a according to claim 15 wherein the composition comprises one or more monomers selected from the group consisting of acetoacetoxyethyl acrylate, acetoacetoxyethyl methacrylate, acetoacetoxypropyl acrylate, and acetoacetoxypropyl methacrylate, one or more monomers selected from the group consisting of styrene, methyl acrylate, ethyl acrylate, methyl methacrylate, ethyl acrylate, and one or more monomers selected from the group consisting of divinylbenzene, trivinylbenzene ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

18. A process a according to claim 17 wherein the composition comprises acetoacetoxyethyl methacrylate, styrene and divinylbenzene.

19. A process according to either of claim 1 or claim 2 wherein the insoluble, non-film forming scavenger resin is an insoluble, non-film forming scavenger resin obtainable by aqueous suspension polymerisation of a composition comprising one or more monomers containing only one polymerisable double bond, one or more monomers containing two or more polymerisable double bonds, and a functionalised monomer comprising pendant 1,3-ketoester or 1,3-ketoamide groups attached by means of a linker to a single monomer type.

20. A process according to claim 19 wherein
   a) the monomer(s) containing only one polymerisable double bond is selected from the group consisting of styrene, α-methyl styrene, methyl styrene, t-butyl styrene, bromo styrene, acetoxy styrene, di-n-butyl maleate, di-n-butyl fumarate, vinyl acetate, vinyl propionate, vinyl laurate, vinyl esters of versatic acid, methyl acrylamide, ethyl acrylamide, methyl methacrylamide, ethyl methacrylamide, acrylonitrile, methacrylonitrile, methyl acrylate, ethyl acrylate, n-butyl acrylate, 2-ethylhexyl acrylate, i-propyl acrylate, n-propyl acrylate, methyl methacrylate, ethyl methacrylate, n-butyl methacrylate, 2-ethylhexyl methacrylate, i-propyl methacrylate, n-propyl acrylate, hydroxyethyl acrylate, hydroxyethyl methacrylate, N,N-dimethylaminoethyl acrylate, and N,N-dimethylaminoethyl methacrylate;
   b) the monomer(s) containing two or more polymerisable double bonds is selected from the group consisting of divinylbenzene, trivinylbenzene, ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine;
   c) and the functionalised monomer comprising pendant 1,3-ketoester or 1,3-ketoamide groups attached by means of a linker to a single monomer type has the general formula 2:

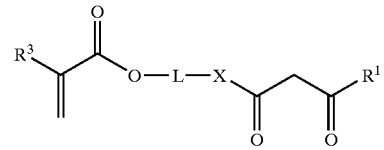

(2)

wherein
   $R^1$ is an optionally substituted hydrocarbyl, perhalogenated hydrocarbyl or heterocyclyl group;

X is O or NR$^2$, wherein the free valence of O or NR$^2$ is bonded to a polymer support optionally via a linker;

R$^2$ is hydrogen, an optionally substituted hydrocarbyl, or heterocyclyl group;

R$^3$ is an optionally substituted hydrocarbyl, perhalogenated hydrocarbyl or heterocyclyl group; and L is a linking group.

21. A process a according to claim 19 wherein the composition comprises one or more monomers selected from the group consisting of acetoacetoxyethyl acrylate, acetoacetoxyethyl methacrylate, acetoacetoxypropyl acrylate, and acetoacetoxypropyl methacrylate, one or more monomers selected from the group consisting of styrene, methyl acrylate, ethyl acrylate, methyl methacrylate, ethyl acrylate, and one or more monomers selected from the group consisting of divinylbenzene, trivinylbenzene ethylene glycol diacrylate, ethylene glycol dimethacrylate, trimethylolpropane triacrylate, trimethylolpropane trimethacrylate, ethylene bisacrylamide, pentaerythritol triacrylate, pentaerythritol tetraacrylate, pentaerythritol trimethacrylate, pentaerythritol tetramethacrylate and N,N-bis-acryloyl ethylene diamine.

22. A process a according to claim 21 wherein the composition comprises acetoacetoxyethyl methacrylate, styrene and divinylbenzene.

* * * * *